US011687639B2

(12) United States Patent
Noe et al.

(10) Patent No.: US 11,687,639 B2
(45) Date of Patent: Jun. 27, 2023

(54) CREDENTIAL MANAGEMENT FOR MOBILE DEVICES

(71) Applicant: MASTERCARD INTERNATIONAL INCORPORATED, Purchase, NY (US)

(72) Inventors: James Noe, West Wickham (GB); John Tierney, Wirral (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 615 days.

(21) Appl. No.: 16/667,177

(22) Filed: Oct. 29, 2019

(65) Prior Publication Data
US 2020/0151311 A1 May 14, 2020

(30) Foreign Application Priority Data
Nov. 14, 2018 (EP) ........................................ 8206253

(51) Int. Cl.
*G06F 21/33* (2013.01)
*G06F 21/60* (2013.01)
(Continued)

(52) U.S. Cl.
CPC ............ *G06F 21/33* (2013.01); *G06F 21/602* (2013.01); *G06Q 20/325* (2013.01);
(Continued)

(58) Field of Classification Search
None
See application file for complete search history.

(56) References Cited

U.S. PATENT DOCUMENTS 7,472,827 B2 * 1/2009 Fletcher .................... G07F 7/10
235/382
8,930,274 B1 * 1/2015 Brickell ................. G06Q 20/40
705/67

(Continued)

FOREIGN PATENT DOCUMENTS

EP          0695148 B1    10/1999
KR         10-1843660     3/2018
WO      WO2017/160877     9/2017

OTHER PUBLICATIONS

EMV Integrated Circuit Card Specifications for Payment Systems, version 4.3, Book 2 (Security and Key Management), Appendix A1.3, Nov. 2011, 174 pgs.

*Primary Examiner* — Michael W Chao
(74) *Attorney, Agent, or Firm* — Harness, Dickey & Pierce, P.L.C.

(57) ABSTRACT

The present disclosure relates to credential management for mobile devices that can be used for access to secured physical environments. One aspect comprises a computer implemented method comprising a mobile computing device: receiving, from a server system, and storing, on the mobile computing device: one or more application sequence counter values, one or more limited use credentials (LUCs), each LUC being bound to a corresponding one of the application sequence counter values; one or more emergency credentials, and an account token; subsequently receiving an authentication request from a terminal; in response to receiving the authentication request, determining that no LUC is available for fulfilling the request; and in response to determining that no LUC is available for fulfilling the request: transmitting, to the terminal, the account token and an application cryptogram generated from an emergency credential of said one or more emergency cre- (Continued)

FIG. 6A dentials; and updating a current application sequence counter.

8 Claims, 7 Drawing Sheets

(51) Int. Cl.
    *G06Q 20/32*     (2012.01)
    *G06Q 20/38*     (2012.01)
    *G06Q 20/40*     (2012.01)
    *H04W 12/06*     (2021.01)
    *H04W 12/041*     (2021.01)
    *H04W 12/75*     (2021.01)
    *H04W 12/069*     (2021.01)

(52) U.S. Cl.
    CPC ....... *G06Q 20/3821* (2013.01); *G06Q 20/401* (2013.01); *G06Q 20/4014* (2013.01); *H04W 12/041* (2021.01); *H04W 12/06* (2013.01); *H04W 12/069* (2021.01); *H04W 12/75* (2021.01)

(56) References Cited

U.S. PATENT DOCUMENTS

| | | | | |
|---|---|---|---|---|
| 10,484,345 B2* | 11/2019 | Shastry | ................ | G06Q 20/36 |
| 11,250,391 B2* | 2/2022 | Sabba | ................ | G06Q 20/0457 |
| 11,438,764 B2* | 9/2022 | Avetisov | ............. | H04W 12/069 |
| 11,461,780 B2* | 10/2022 | Todasco | ............. | G06Q 20/322 |
| 11,488,139 B2* | 11/2022 | Runyan | ............... | G06Q 20/325 |
| 11,488,173 B1* | 11/2022 | Wall | ................ | G06Q 20/4012 |
| 11,522,861 B2* | 12/2022 | Touati | ................ | H04L 9/3234 |
| 2005/0123142 A1* | 6/2005 | Freeman | ............. | H04L 9/0891 |
| | | | | 713/155 |
| 2010/0027786 A1* | 2/2010 | Faith | ................ | H04L 9/3226 |
| | | | | 380/28 |
| 2013/0030997 A1* | 1/2013 | Spodak | ............. | G06Q 20/3572 |
| | | | | 705/41 |
| 2013/0262317 A1* | 10/2013 | Collinge | ............ | G06Q 20/4012 |
| | | | | 705/72 |
| 2015/0180836 A1* | 6/2015 | Wong | ................ | H04L 9/0869 |
| | | | | 713/172 |
| 2015/0180868 A1* | 6/2015 | Sng | ................ | G06F 21/335 |
| | | | | 726/9 |
| 2015/0254638 A1* | 9/2015 | Bondesen | ............. | G06Q 20/36 |
| | | | | 705/41 |
| 2015/0339664 A1* | 11/2015 | Wong | ................. | H04W 12/069 |
| | | | | 705/71 |
| 2016/0012432 A1* | 1/2016 | Meshkati | ............. | G06Q 20/322 |
| | | | | 705/44 |
| 2016/0036790 A1* | 2/2016 | Shastry | ................ | H04W 12/06 |
| | | | | 713/168 |
| 2016/0057619 A1* | 2/2016 | Lopez | ................ | G06Q 20/382 |
| | | | | 380/247 |
| 2016/0065370 A1* | 3/2016 | Le Saint | ............. | H04L 9/0861 |
| | | | | 713/155 |
| 2016/0092872 A1* | 3/2016 | Prakash | ............. | G06Q 20/326 |
| | | | | 705/65 |
| 2016/0140550 A1 | 5/2016 | Keys | | |
| 2016/0218875 A1* | 7/2016 | Le Saint | ............. | H04L 63/0435 |
| 2016/0253651 A1 | 9/2016 | Park et al. | | |
| 2016/0267465 A1* | 9/2016 | Metral | ................ | G06Q 20/322 |
| 2016/0277363 A1* | 9/2016 | Kaladgi | ............. | H04L 63/0428 |
| 2017/0178121 A1* | 6/2017 | Roberts | ................ | G06Q 20/20 |
| 2018/0047016 A1* | 2/2018 | Sarin | ................ | G06Q 20/3674 |
| 2018/0068303 A1* | 3/2018 | Wall | ................ | H04L 9/3247 |
| 2018/0183579 A1* | 6/2018 | Roberts | ............. | G06Q 20/3829 |
| 2019/0147515 A1* | 5/2019 | Hurley | ............... | G06Q 20/3821 |
| | | | | 705/44 |
| 2019/0190704 A1* | 6/2019 | Srivastava | ............ | H04L 9/0825 |
| 2019/0363889 A1* | 11/2019 | Wang | ................ | H04L 9/006 |
| 2019/0370790 A1* | 12/2019 | Spector | ................ | G06Q 20/322 |
| 2020/0045027 A1* | 2/2020 | Shastry | ................ | G06Q 20/382 |
| 2020/0314644 A1* | 10/2020 | Dean | ................ | H04W 12/08 |
| 2020/0372504 A1* | 11/2020 | Herrington | ........... | H04W 12/06 |
| 2021/0344672 A1* | 11/2021 | Drechsler | .......... | G06Q 20/3226 |
| 2022/0019995 A1* | 1/2022 | Ngo | ................ | H04L 9/0869 |

\* cited by examiner

CREDENTIAL MANAGEMENT FOR MOBILE DEVICES

CROSS-REFERENCE TO RELATED APPLICATION

This application claims the benefit of, and priority to, European Patent Application No. 18206253.9 filed on Nov. 14, 2018. The entire disclosure of the above application is incorporated herein by reference.

FIELD

The present disclosure relates to credential management for mobile devices that can be used for access to secured physical environments, such as mass transit systems.

BACKGROUND

This section provides background information related to the present disclosure which is not necessarily prior art.

Mobile computing devices, such as smartphones and smart watches, are becoming ubiquitous in modern society. In addition to communications functionality, mobile devices have been used more recently in other applications, such as payments. In particular, it is possible to store payment credentials on a mobile device which has a contactless interface, such as a near field communications (NFC) or magnetic secure transmission (MST) interface, such that the mobile device may be used at a payment terminal in the same way as a conventional payment card equipped with an integrated circuit or magnetic stripe.

Because payment credentials are highly sensitive, it is necessary for them to be handled in a secure manner by the mobile device. Some mobile devices are equipped with a secure element (SE) which is physically and logically protected against attack, and which stores the cryptographic software, keys and credentials needed for the device to be used as a payment device. Other devices employ a Trusted Execution Environment (TEE), which is a secure area of a main processor that is accessible only to trusted applications. In such devices the cryptographic software and keys, as well as payment and/or identification credentials, may be stored in the TEE.

Another way to enable payment functionality on a mobile device is to employ a technique known as Host Card Emulation (HCE). An HCE-enabled device does not store sensitive payment information directly on the device. Instead, the sensitive information is stored by a remotely-located cloud-based payments backend system (CBPBS) and payment credentials are provisioned to the device over a secure communications channel as needed. For this reason, HCE-implemented payments are sometimes called "cloud based payments".

Typically, a small number (10 to 20) of limited-use credentials (LUCs) may be transmitted to the mobile device for use by a transaction application on the device. Over time, the LUCs are consumed and their number may fall below a threshold level (e.g., less than 50%), at which point the device may send a request to the CBPBS for additional LUCs. Each LUC can be used for at least one transaction. Use of each LUC is limited to either a predetermined number of transactions or a predetermined time period. In one type of implementation, each LUC can only be used for a single transaction and can never be re-used.

LUCs are used, for example, in Mastercard® Cloud-Based Payments. In that system, an LUC always comprises a credential known as a Session Key (SK) to validate the device. In some implementations, the LUC may also comprise another SK credential, or another type of credential known as a Single Use Key (SUK), to authenticate the user. SUKs are only used if the Consumer Device Cardholder Verification Method (CDCVM) mechanism uses a Mobile PIN, which is normally entered by the consumer but may be automatically provided by the payment application in some implementations. Thus each LUC may comprise either a single SK, two SKs or an SK plus an SUK. Whatever the LUC's composition, each component of the LUC is associated with the same diversification value which is based on an application transaction counter (ATC), for example, according to Appendix A1.3 of EMV Integrated Circuit Card Specifications for Payment Systems, version 4.3, Book 2 (Security and Key Management). The diversification value may be limited to use in a predetermined number of transactions (which could be one), or for a predetermined time period, thus limiting use of the LUC as described in the preceding paragraph.

In some HCE implementations, a master key is stored in volatile memory for the purpose of providing access to the LUCs. The LUC master key is generated by the CBPBS, for example, using device specific information and transmitted to the device when it is powered on, and is used to decrypt LUCs on request by, for example, a transaction application. When the device is powered off, the master key is deleted, such that a malicious actor cannot obtain and use any of the LUCs.

Payment devices, including conventional cards and payment-enabled mobile devices, can now be used for access to some mass transit systems. This is known as an "open loop" system because it allows devices other than those issued by the transit operator to be used for access and payment. For example, fare payments on some city public transport networks formerly required the use of paper tickets or a dedicated prepaid contactless card, whereas now credit, debit and prepaid cards and payment-enabled mobile devices with contactless functionality are often accepted for this purpose.

When a payment device is used at a transit terminal, authorization of a transaction (whether carried out online or offline) proceeds in much the same way as for a normal payment transaction. That is, the transit terminal acts as a contactless payment terminal to enable fare payments, and may also include a gate control circuit or other means for controlling opening and closing of a gate depending on the outcome of the fare payment. In the case of a payment-enabled mobile device which employs LUCs as discussed above, an LUC is consumed once its usage limits are exceeded. This may occur following a predetermined number of uses (which could be a single use), or following expiry of a predetermined time period.

Some transit systems require users to "tap in" and "tap out" at contactless terminals for entry and exit, respectively. This may give rise to a problem in the context of HCE-based transaction applications, because the user may lose connectivity after entry. If the user's LUCs are depleted on entry, or otherwise become inaccessible during the journey (such as by being locked if the user happens to power off their device and thus loses the LUC master key), there is no way for the device to go online to replenish the LUC store. The user is thus unable to tap out and may be unable to exit the transit system, or may be overcharged due to not having tapped out at the actual exit point. Furthermore, any ticket/revenue inspection during the journey may also fail for the reasons listed above.

The present disclosure seeks to address the above problem.

SUMMARY

This section provides a general summary of the disclosure, and is not a comprehensive disclosure of its full scope or all of its features. Aspects and embodiments of the disclosure are set out in the accompanying claims.

According to a first aspect, there is provided a computer implemented method comprising a mobile computing device: receiving, from a server system, and storing, on the mobile computing device: one or more application sequence counter values, one or more limited use credentials (LUCs), each LUC being bound to a corresponding one of the application sequence counter values; one or more emergency credentials, and an account token; subsequently receiving an authentication request from a terminal; in response to receiving the authentication request, determining that no LUC is available for fulfilling the request; and in response to determining that no LUC is available for fulfilling the request: transmitting, to the terminal, the account token and an application cryptogram generated from an emergency credential of said one or more emergency credentials; and updating a current application sequence counter.

The method can further comprise: receiving an LUC master key with which the stored LUCs are encrypted; and storing the LUC master key only in a volatile memory device of the mobile computing device.

Each emergency credential can be bound to a corresponding one of the application sequence counter values and the application cryptogram can be generated from both the emergency credential and its corresponding application sequence counter value; or the application cryptogram can be generated from the emergency credential and the current application sequence counter value.

The method can further comprise the mobile computing device: subsequent to updating the current application sequence counter, determining that the current application sequence counter value matches the application sequence counter value of one of the LUCs; and in response to determining that the current application sequence counter value matches the application sequence counter value of one of the LUCs, deleting the matching LUC from the mobile computing device.

The method can further comprise the mobile computing device, in response to receiving the authentication request, determining that the authentication request relates to a zero-value transaction; wherein transmitting the account token and the application cryptogram is in response to determining that the authentication request relates to a zero-value transaction.

The method can further comprise the mobile computing device, subsequent to transmitting the application cryptogram to the terminal and updating the current application sequence counter: detecting that communication over the internet is possible; and in response to detecting that communication over the internet is possible, transmitting a request, to a server system, for one or more additional LUCs and one or more additional emergency credentials, wherein the request comprises the current application sequence counter value.

According to a second aspect, there is provided a mobile computing device comprising a memory and communication apparatus each communicatively coupled to a processor, the memory storing instructions which, when executed by the processor, cause the mobile computing device to perform the method of the first aspect.

According to a third aspect, there is provided a computer implemented method comprising a server system: receiving a provisioning request from a mobile computing device, the request comprising account credentials; authenticating that the provisioning request was received from a mobile computing device linked to the account the account credentials are for; storing the account credentials; generating an account token bound to the account credentials; generating one or more limited use credentials (LUCs) using an application sequence counter, each LUC being bound to a corresponding application sequence counter value; generating one or more emergency credentials; and transmitting the account token, the one or more LUCs, their respective application sequence counter values and the one or more emergency credentials to the mobile computing device.

The method can further comprise, subsequent to transmitting the one or more emergency credentials to the mobile computing device: receiving, from a payment network, a request to validate use of one of the one or more emergency credentials in a transaction; and transmitting a transaction validation to the payment network.

Each LUC can be generated based on a first issuer master key and each emergency credential can be generated based on a second, different, issuer master key.

The one or more LUCs and the one or more emergency credentials can all be generated based on the same issuer master key; the method can further comprise, subsequent to receiving the request to validate use of one of the one or more emergency credentials in a transaction, determining that the transaction is a zero-value transaction; wherein the transaction validation is transmitted to the payment network in response to determining that the transaction is a zero-value transaction.

The one or more LUCs can be transmitted to the mobile computing device together with an LUC master key with which they are either already encrypted, or with which they will be encrypted for storage when received by the mobile computing device; the one or more emergency credentials can be generated using the application sequence counter, each emergency credential being bound to a corresponding application sequence counter value; and the one or more emergency credentials can be transmitted together with their respective application sequence counter values.

The method can further comprise, subsequent to transmitting the account token, the one or more LUCs, their respective application sequence counter values and the one or more emergency credentials to the mobile computing device: receiving a request from the mobile computing device for one or more additional LUCs and one or more additional emergency credentials, wherein the request comprises an application sequence counter value, being the application sequence counter value most recently used by the mobile computing device; generating one or more additional LUCs using the application sequence counter, each LUC being bound to a corresponding additional application sequence counter value, with the first additional application sequence counter value being the received application sequence counter value incremented by one; generating one or more additional emergency credentials; and transmitting the account token, the one or more additional LUCs, their respective additional application sequence counter values and the one or more additional emergency credentials to the mobile computing device.

According to a fourth aspect, there is provided a server system comprising a memory and communication apparatus each communicatively coupled to a processor, the memory storing instructions which, when executed by the processor, cause the server system to perform the method of the third aspect.

According to a fifth aspect, there is provided a computer readable medium comprising computer executable instructions which, when executed by a computer processor, cause the computer to perform the method of either of the first or third aspects.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. Aspects of the present disclosure will now be described by way of example with reference to the accompanying figures. In the figures:

FIG. 1 schematically illustrates an exemplary interaction of a mobile device with a transit network and payment network;

FIG. 2 schematically illustrates an exemplary architecture of a mobile device;

FIG. 3 schematically illustrates an exemplary architecture of a CBPBS;

Corresponding reference numerals indicate corresponding parts throughout the several views of the drawings.

DETAILED DESCRIPTION

Embodiments will be described, by way of example only, with reference to the drawings. The description and specific examples included herein are intended for purposes of illustration only and are not intended to limit the scope of the present disclosure.

Figure 1:
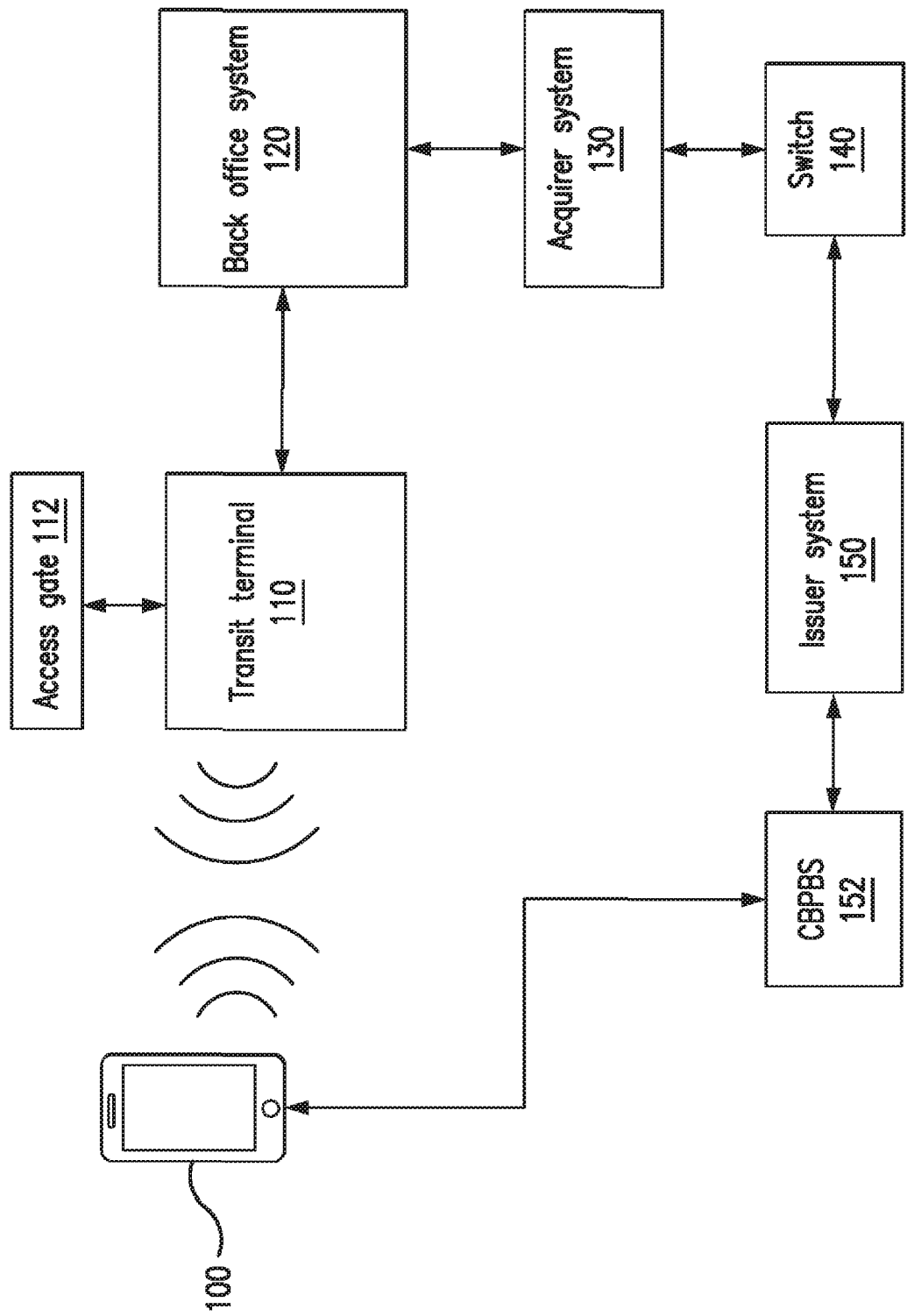

Referring initially to FIG. 1, the interaction of a payment-enabled mobile device 100 with a transit terminal 110, operative to control an entry or exit gate 112, is shown in schematic form. The mobile device 100 communicates with the transit terminal 110 using a short-range radio communication protocol, such as NFC, for example, by sending and receiving application protocol data units (APDUs) as defined by the ISO/IEC 7816-4 standard. When the mobile device 100 enters the polling field of the transit terminal 110, a transaction application on the mobile device 100 is activated and transmits a request, indicating payment and/or identification credentials, to the transit terminal 110 to cause it to open the gate 112, as will be described in more detail below.

The mobile device 100 is also able to communicate with a CBPBS 152 in order to request, and receive, credentials for use in payment and/or non-payment contexts, such as transit or other physical access applications such as hotel room access or car hire. The CBPBS 152 generates tokens, which are representations of payment card credentials that do not contain the real primary account number (PAN) of the payment card, and provisions the tokens to the mobile device 100 for future use in payments and/or non-payment transactions.

In FIG. 1, a transit terminal 110 is shown. The transit terminal 110 may alternatively be referred to as a "transit system transaction terminal" or "transit system contactless transaction terminal" in the sense that the terminal 110 may engage in "transactions" with devices, such as contactless IC cards, payment-enabled mobile devices, etc. The term "transaction" should be understood to refer to any exchange of data between the transit system terminal 110 and another device in which the other device identifies the holder of the device and/or indicates that the holder is entitled to enter the transit system and/or provides data required for arrangements to be made for payment for the holder's use of the transit system. An access gate 112 to the transit system is operatively coupled to the transit terminal 110 and is under control of the transit terminal 110. In some examples, the transit terminal 110 may be physically integrated with the access gate 112.

The transit terminal 110 may include a processor/CPU (central processing unit) which provides overall control of the functioning of the transit system terminal 110. The transit terminal 110 may also include one or more memory/storage devices. The memory may be in communication with the processor and may store program instructions that control the processor such that the transit system terminal 110 provides desired functionality. The transit terminal 110 may further include a gate control circuit operatively coupled to, and controlled by, the processor, the gate control circuit providing signals for controlling opening and closing of the access gate 112.

Figure 2:
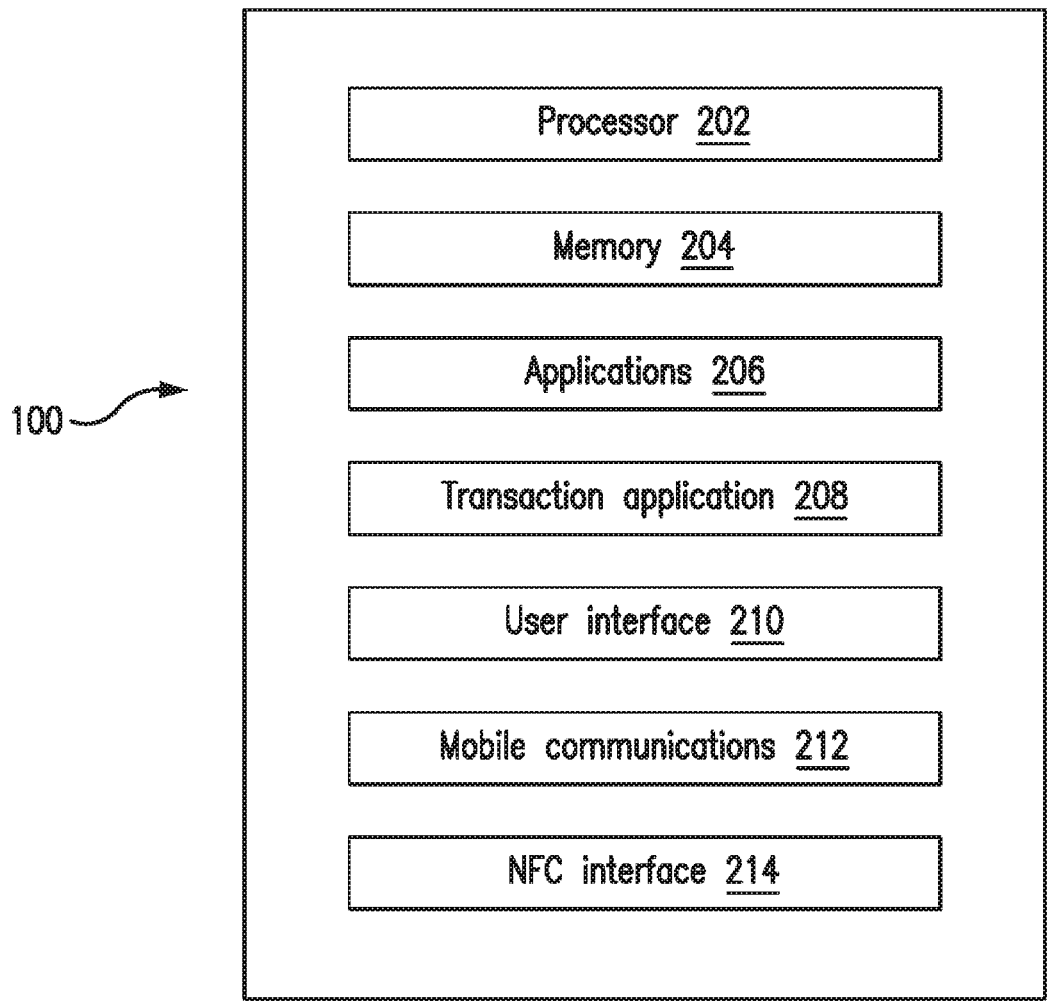

Turning now to FIG. 2, an exemplary architecture of a mobile device 100 is shown. The mobile device 100 includes a mobile processor 202, and storage/memory devices 204. The storage/memory devices 204 are in communication with the processor 202 and may contain program instructions to control the processor 202 to manage and perform various functions of the mobile device 100. Applications 206 executable by the mobile device 100 may be stored in the storage/memory devices 204, together with a mobile operating system having HCE support built into its kernel (not shown), for execution by the processor 202.

A transaction application 208 is shown separately from the applications 206. The transaction application 208 may be stored in the storage/memory devices 204 in similar fashion to the other applications 206 executable by the mobile device 100, or may be stored in other hardware components of the mobile device 100, such as a secure element, or in a trusted execution environment of the main processor 202.

Typically, the transaction application 208 is a general purpose payment app that provides access to a payment account system that is accepted by a mass transit system. The payment app in this case need not be specially adapted for obtaining entry to transit systems. In particular, the transaction application 208 may contain code and data to enable the mobile device 100 to be used in EMV-type transactions. In some examples, code and/or data of the transaction application 208 may be protected, for example, by obfuscation, white box cryptography and/or other techniques.

As is typical for mobile devices, the mobile device 100 may include mobile communications functions as represented by block 212. The mobile communications functions may comprise voice and data communications via a mobile communication network with which the mobile device 100 is registered.

In addition, to facilitate use as a payment-enabled device, the mobile device 100 may include short-range radio communications capabilities, including, for example, an NFC interface 214. Thus block 214 may represent a suitable antenna (not separately shown) that is appropriate for NFC communications as well as driving and receiving circuitry associated with the antenna.

Also represented by block 214, and associated with the short-range radio communications capabilities of the mobile device 100, is hardware known as the contactless frontend (CLF). The CLF may overlap with other aspects of block 214 that have already been mentioned.

It will be appreciated that the blocks depicted in FIG. 2 as components of the mobile device 100 may in effect overlap with each other, and/or there may be functional connections among the blocks which are not explicitly shown in the drawing. It may also be assumed that, like a typical smartphone, the mobile device 100 may include a rechargeable battery (not shown) that is contained within a housing of the mobile device 100 and that provides electrical power to its active components.

The mobile device 100 may be embodied as a smartphone, but this assumption is not intended to be limiting, as the mobile device 100 may alternatively, in at least some cases, be constituted by a tablet computer, smartwatch or by other types of portable electronic devices.

Figure 3:
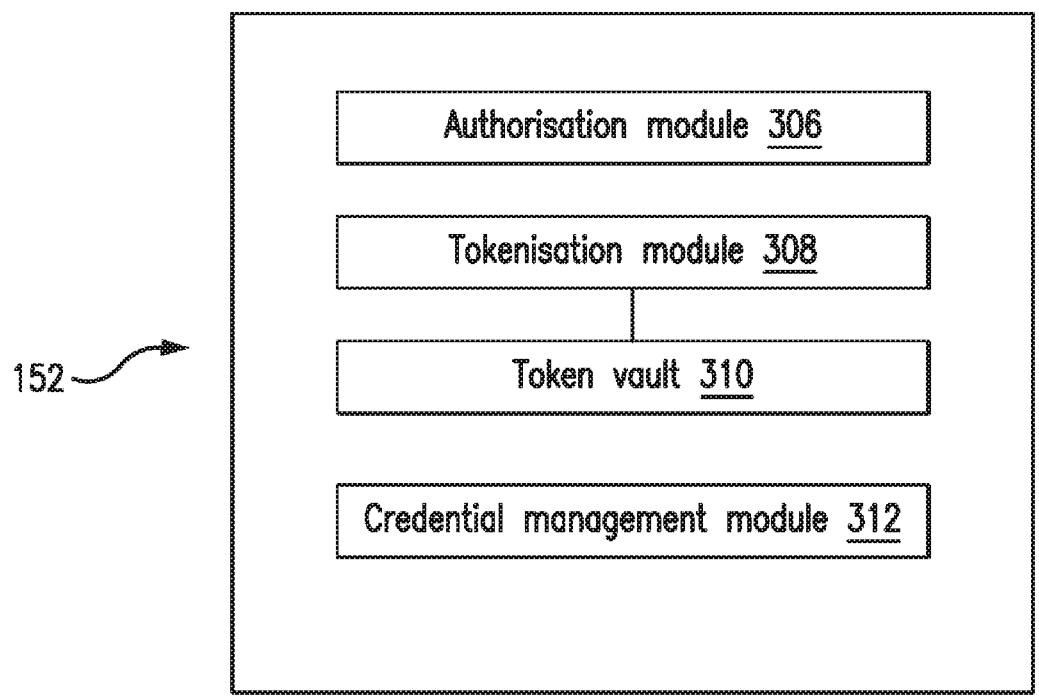

FIG. 3 shows an exemplary architecture of a CBPBS 152, which may comprise one or more servers configured to carry out various functions of the system. Each of the modules shown in FIG. 3 may be executed by a separate server, for example. Different servers may be operated by different entities. For example, the authorization module 306 may be operated by an issuer 150 while the tokenization module 308 and credential management module 312 may be operated by a trusted third party.

The CBPBS 152 comprises a tokenization module 308 which receives requests from the transaction application 208 of the mobile device 100 to provision credentials such that they can be used by the transaction application 208 in transactions conducted with the mobile device 100 at a contactless terminal. For example, when a user of the mobile device 100 requests provisioning of a payment card (which may be a physical card or a virtual card), the tokenization module 308 may generate a token which maps to the primary account number (PAN), expiry date and card verification code (CVC) of the card. The token may comprise an alphanumeric string, such as a 16-digit number, which has the same format as a PAN and is recognized as such by a payment network for the purposes of processing an authorization request. The tokenization module 308 stores the mapping between the token and the payment credentials, in a token vault 310 which is accessible only to the CBPBS 152. Further, the tokenization module 308 may associate one or more rules with the token, such as restrictions on the number of transactions, its lifetime, a type of merchant at which it may be used, or a transaction environment in which it may be used.

The credential management module 312 is responsible for generating LUCs, for example, in association with tokens generated by the tokenization module 308, for provisioning to the mobile device 100. In order to do so, the credential management module 312 may derive, for a payment card requested to be provisioned by mobile device 100, an integrated circuit card (ICC) master key. The ICC master key is derived by passing an issuer master key of an issuer 150 of the payment card, and the tokenized or actual PAN, to a key derivation algorithm. Exemplary key derivation algorithms are set out in Appendix A1.4 of the EMV Integrated Circuit Card Specifications for Payment Systems, version 4.3, Book 2 (Security and Key Management). Next, one or more LUCs can be derived from the ICC master key and a diversification value which is based on an ATC, for example, according to Appendix A1.3 of the aforementioned EMV specification. Accordingly, each LUC is bound to a unique ATC. Typically, ICC master keys are stored in a hardware security module (HSM) of the credential management module 312.

In some examples, the credential management module 312 generates an LUC master key which is used to encrypt the LUCs while stored on the mobile device 100. This LUC master key may be transmitted alongside the LUCs, and stored by the transaction application 208 in volatile memory, such that it is available for use by the transaction application 208 while the mobile device 100 is powered on, but is deleted as soon as the device is powered off, such that the LUCs are protected while the device is powered off.

According to the present disclosure, in addition to LUCs, the credential management module 312 generates one or more emergency credentials. This may be done in several different ways, as will be explained in more detail below. In one example, if an LUC master key is used to protect the LUCs, the emergency credentials may be generated in much the same way as the LUCs, with each being bound to an ATC, but may be transmitted to the mobile device 100 and stored without being encrypted by the LUC master key. This means that the emergency credentials are available even if the LUC master key is lost and the mobile device 100 does not have connectivity. In another example, the emergency credentials may be derived from a different issuer master key than the one used to derive the LUCs, but are not bound to a specific ATC.

Figure 4:
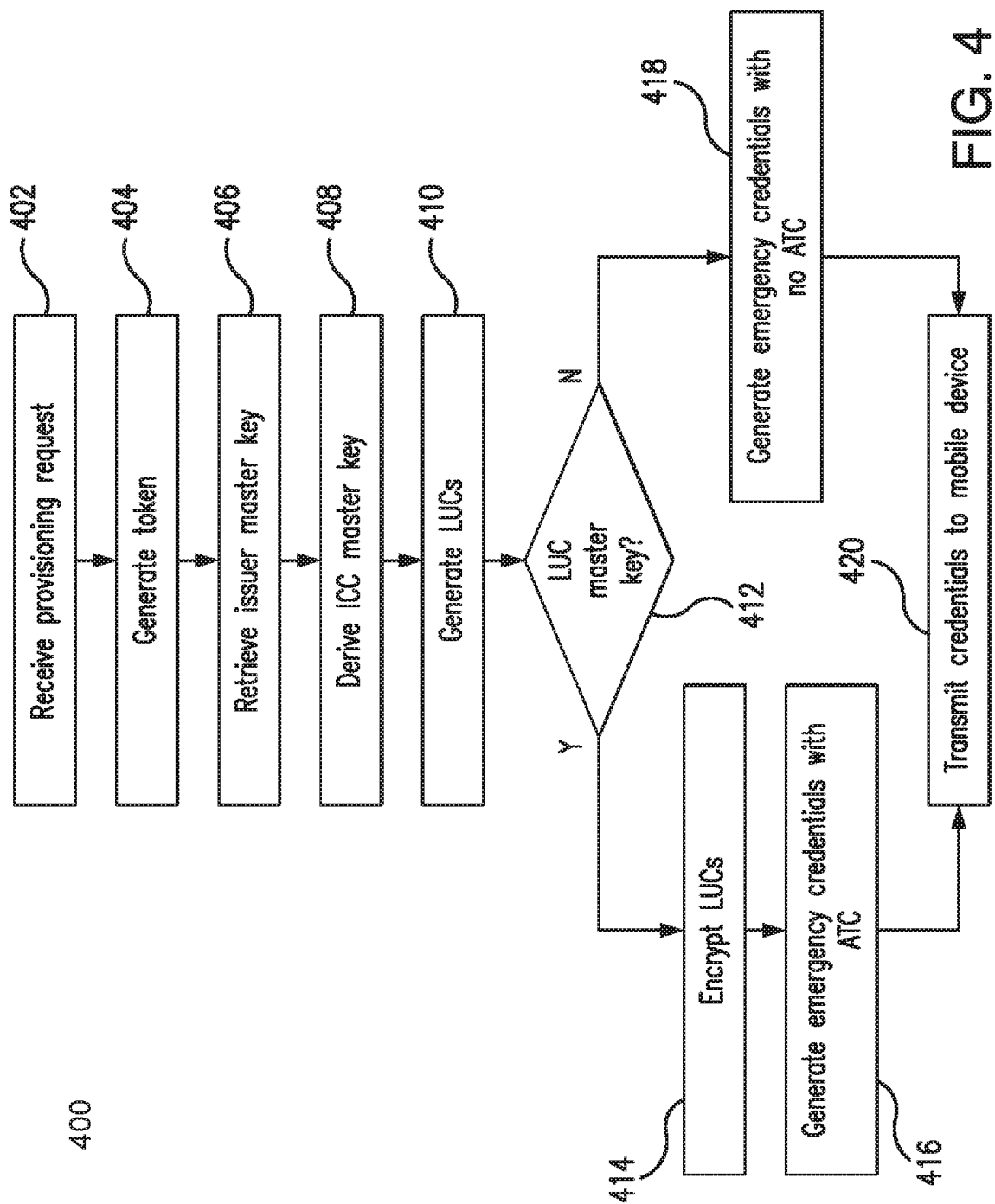
FIG. 4 is a flowchart illustrating an exemplary method of provisioning credentials to a mobile device.

Turning now to FIG. 4, a method 400 of provisioning credentials to a mobile device is shown from the perspective of a CBPBS 152. The method 400 is carried out the first time that a user provisions a card for use with the transaction application 208.

At step 402, the CBPBS 152 receives a provisioning request from the mobile device 100. The provisioning request identifies the account to be provisioned onto the mobile device via account credentials. For example, the request may comprise a PAN, expiry date, and CVC and optionally cardholder name and billing address. The CBPBS must then authenticate that the provisioning request originates from a mobile device held by an authorized user of the account. In order to do this, at step 404, the CBPBS 152 (for example, via tokenization module 308) may transmit a request to the issuer 150 of the card to cause the generation of a confirmation code, which is sent to the mobile device 100 by the issuer 150 using contact details the issuer stores as registered to the account, for example, by email or SMS. The code is also sent to the CBPBS 152. The user is requested to enter, at the mobile device 100, the confirmation code, and on the CBPBS 152 confirming that it matches the code it has received from the issuer 150, the CBPBS 152 generates a token, and stores a mapping of the token to the PAN in the token vault 310. Alternative authentication methods could be used, for example, making use of a mobile banking app running on the mobile device.

At step 406, the CBPBS 152 retrieves an issuer master key for the issuer 150. This may be stored by the CBPBS 152 (in an HSM, for example), or may be requested from the issuer 150 at runtime. Next, at step 408, the credential management module 312 of the CBPBS 152 derives an ICC master key for the card being provisioned, stores this securely (such as in an HSM), and at step 410, generates one or more LUCs using the ICC master key and an ATC. Successively generated LUCs have progressively greater ATCs, typically increasing in increments of 1.

At step 412, method 400 may choose to provision the LUCs in conjunction with an LUC master key, in which case the method 400 branches to step 414, where the generated LUCs are encrypted using the LUC master key. The LUC master key may itself be derived in a number of different ways, for example, based on device-specific information. If proceeding along this branch, the credential management module 312 then generates, at step 416, one or more emergency credentials using the ICC master key and an ATC as inputs to a key derivation algorithm. Again, the ATC for each successive emergency credential is greater than the one before. For example, the credential management module 312 may generate two emergency credentials which are not protected by the LUC master key, such that a first one of the emergency credentials can be used for an inspection tap (i.e., for a transit official to confirm validity of the mobile device 100 for fare payment), and a second emergency credential can be used to exit at an access gate 112.

If an LUC master key is not to be used, then at step 412 the method 400 branches to step 418, where one or more emergency credentials are generated, each emergency credential not being associated with an ATC. The credential management module 312 of the CBPBS 152 may request a second, different, issuer master key for the purpose of deriving a second ICC master key as input to a key derivation algorithm to generate an emergency credential. Alternatively, the credential management module 312 may use the same issuer master key and thus ICC master key to generate an emergency credential, but restrict the generated emergency credential to be used for specific, non-retail transactions, such as transit-related transactions or other zero-value transactions.

At step 420, the LUCs, emergency credentials, and LUC master key (if any) are transmitted to the mobile device 100, together with the token, for storage on storage/memory devices 204 of the mobile device 100. If an LUC master key is transmitted, it is stored only in volatile memory of the storage/memory devices 204.

The flowchart of FIG. 4 depicts the end-to-end process of provisioning a card for the first time. As LUCs and/or emergency credentials are depleted during use of the mobile device 100, the mobile device 100 will eventually need to go back online and connect to CBPBS 152 to replenish one or both sets of credentials. The replenishment process may proceed in substantially the same manner as steps 410 to 420 of FIG. 4, with the exception that the CBPBS 152 also receives, from the mobile device 100, a most recently used ATC value. This value is used as the starting point for incrementing the ATC values which are embedded in the LUCs (and, if appropriate, the emergency credentials).

Figure 5:
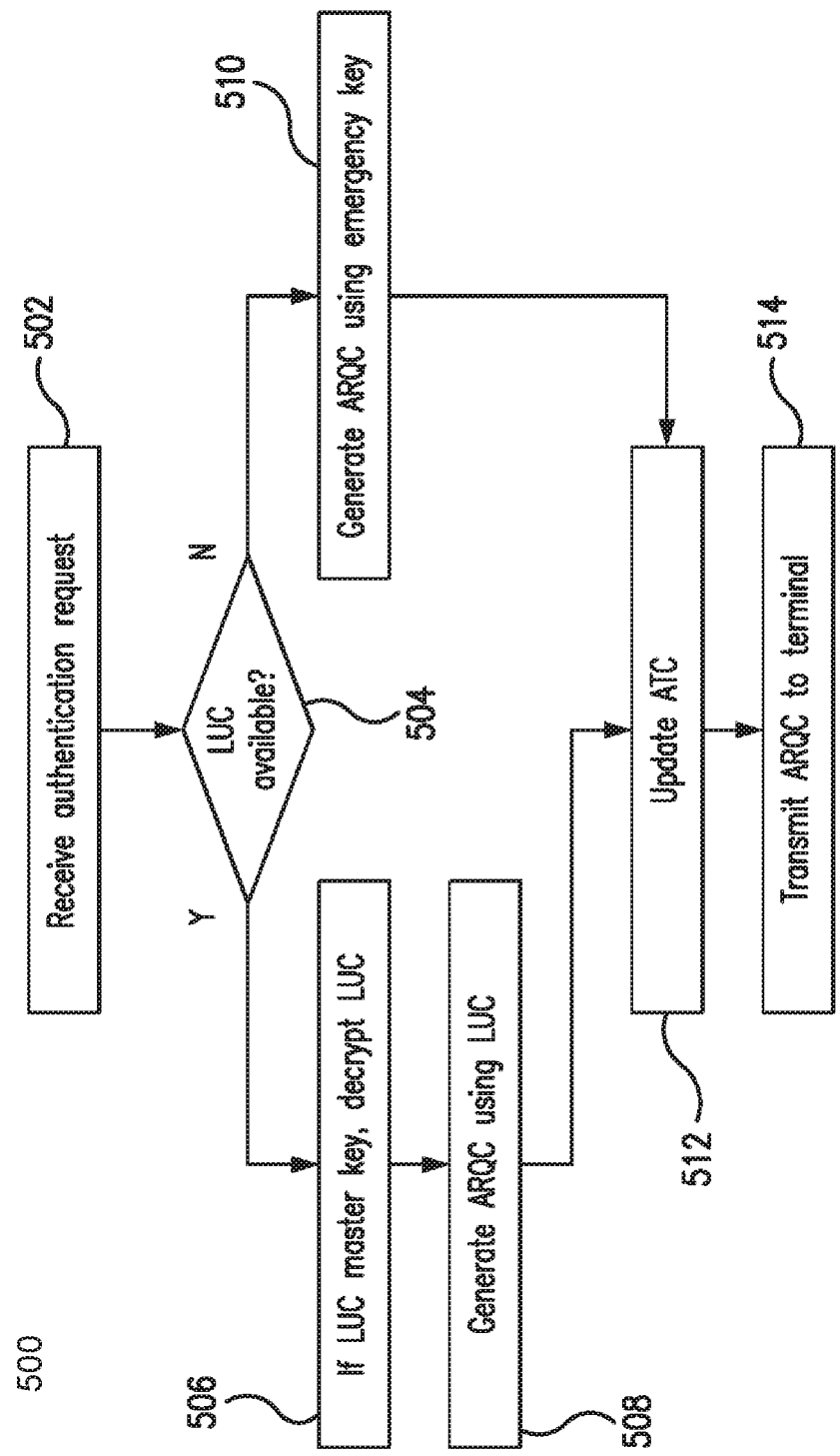
FIG. 5 is a flowchart illustrating an exemplary transaction process.

Turning now to FIG. 5, an exemplary transaction process 500 which makes use of emergency credentials is shown.

To initiate the process 500, the mobile device 100 enters the polling field of a terminal 110, and the transaction application 208 executing on the mobile device 100 and the terminal 110 exchange data in order to initiate a contactless transaction via the NFC interface 214 (and its counterpart in the terminal 110). The nature of the data that is exchanged, and the processing steps undertaken by the respective devices during initiation (such as application selection), will be understood with reference to the EMV specifications. Once initiation is complete, at step 502, the terminal 110 sends an offline authentication request which is received by the transaction application 208.

In response to the authentication request, at step 504, the transaction application 208 determines whether any LUC is available. The LUCs may have become unavailable in a transit context if, for example, a last one of the LUCs on the mobile device 100 has been used to tap in to a transit system, and the mobile device 100 is unable to go online to replenish the LUCs, for example, due to being out of network coverage, e.g., underground. In another example, the LUCs may be unavailable if they are encrypted by an LUC master key which has been deleted from memory during a device power-off or reset event. In either case, the transaction application 208 may cause a warning to be displayed via the user interface 210, such as "You are able to complete this journey, but are unable to make any purchases or start any new journeys until you connect your device to the internet to refresh your payment data".

If at least one LUC is available, then the process branches to step 506, where the transaction application 208 determines whether an LUC master key is present and is required to decrypt the LUC. If so, then the LUC is decrypted, and a generator key of the decrypted LUC is used to generate an EMV application cryptogram, in particular an ARQC (authorization request cryptogram), at step 508.

If no LUC is available at step 504, the process branches to step 510, where an emergency credential is retrieved and used to generate the ARQC. If the emergency credential is bound to an ATC, that ATC is used in generation of the ARQC. Otherwise, a current value of an ATC stored on the storage/memory devices 204 of the mobile device 100 is used in generation of the ARQC. This current value corresponds to the ATC of the most recent transaction, i.e., the previous "tap". In this case, the transaction application 208 checks whether the current ATC value matches the ATC of any LUC. If it does, the matching LUC is deleted, to prevent ATC reuse.

In some examples, the transaction application 208 may restrict use of the emergency credentials to non-payment transactions. For example, the transaction application 208 may require that transaction data received from a terminal, such as the terminal 110, indicate that the terminal is a transit (or other non-payment) terminal, and/or has a transaction value of zero. In some examples, the terminal may transmit a merchant category code (MCC) which is indicative of a non-payment transaction, such as an MCC of 4111, 4131 or 4784, each of which relate to transit. Furthermore, the terminal may transmit the specific merchant name, which could also be used to limit the extent to which the emergency credentials may be used.

At step 512, the current value of the ATC is updated on the storage/memory devices 204 of mobile device 100, and at step 514, the generated ARQC is transmitted to the terminal 110 for online processing of the transaction.

Further steps of the transaction will now be described with reference to FIG. 1. The access gate 112 will allow the user to enter or exit as long as offline data authentication is successfully performed and the device generates an application cryptogram, which is typically an ARQC indicating that an online authorization is required. Alternatively, a transaction certificate (TC) application cryptogram may be generated indicating offline approval. The access gate 112 will not allow the consumer to enter/exit if an application authentication cryptogram (AAC, offline decline) is generated by the device.

Following receipt of the ARQC or TC application cryptogram, the terminal 110 may initiate an authorization request via a back office system 120, such as a public transport operator system, with which it is in communication. The authorization request may take the form of an ISO 8583 0100 authorization request message. The back office system 120 may store the tokenized PAN and the ATC embedded in the ARQC. In a transit system, this information, and the terminal ID, may be used for fare calculation purposes. The ATC may be compared to the previous ATC for the same tokenized PAN to confirm that the mobile device 100 is valid for travel.

The back office system 120 may forward the request to an acquirer processing system 130 (operated by the public transport operator's financial institution), which in turn forwards it to a switch 140 that is capable of routing the request to the correct issuer (i.e., the issuer 150 of the card that has been provisioned onto the mobile device 100 and used in the transaction). The switch 140 may be that of a payment network operator such as Mastercard®. Prior to issuer processing, a third party token vault, such as the Mastercard® Digital Enablement Service (MDES), may detokenize the transaction and validate the application cryptogram data.

Once received by the issuer 150, the authorization request message is examined to determine the account for which authorization is required and any relevant cryptographic validation is performed (if this has not already been performed by a third party token vault). If the issuer is performing detokenization and/or cryptogram validation, the issuer 150 may forward the token and the application cryptogram to its own CBPBS 152, such that the CBPBS 152 can detokenize the PAN (i.e., map the token back to the actual PAN).

If a non-payment emergency credential has been used to generate the ARQC, the CBPBS 152 may determine this and check that the transaction is a transit transaction and that the tap was for a zero amount. This could be done in a number of ways. If the same master key is used to generate the emergency credential and the LUCs then it could be done based on the ATC. Otherwise the backend could infer from previous LUC usage and confirm that the information about the transaction (e.g. merchant category code and transaction amount in the EMV data) imply a zero-value deferred authorization transit transaction. Implementations could, for example, use bits in the chip data which are currently un-used to signal this to the CBPBS.

If authorization of the transaction by the issuer 150 is successful, an authorization approval message is transmitted to the acquirer processing system 130 via the switch 140, and then forwarded to the back office system 120. The back office system 120 uses the approval as input to its fare calculation system.

Figure 6A:
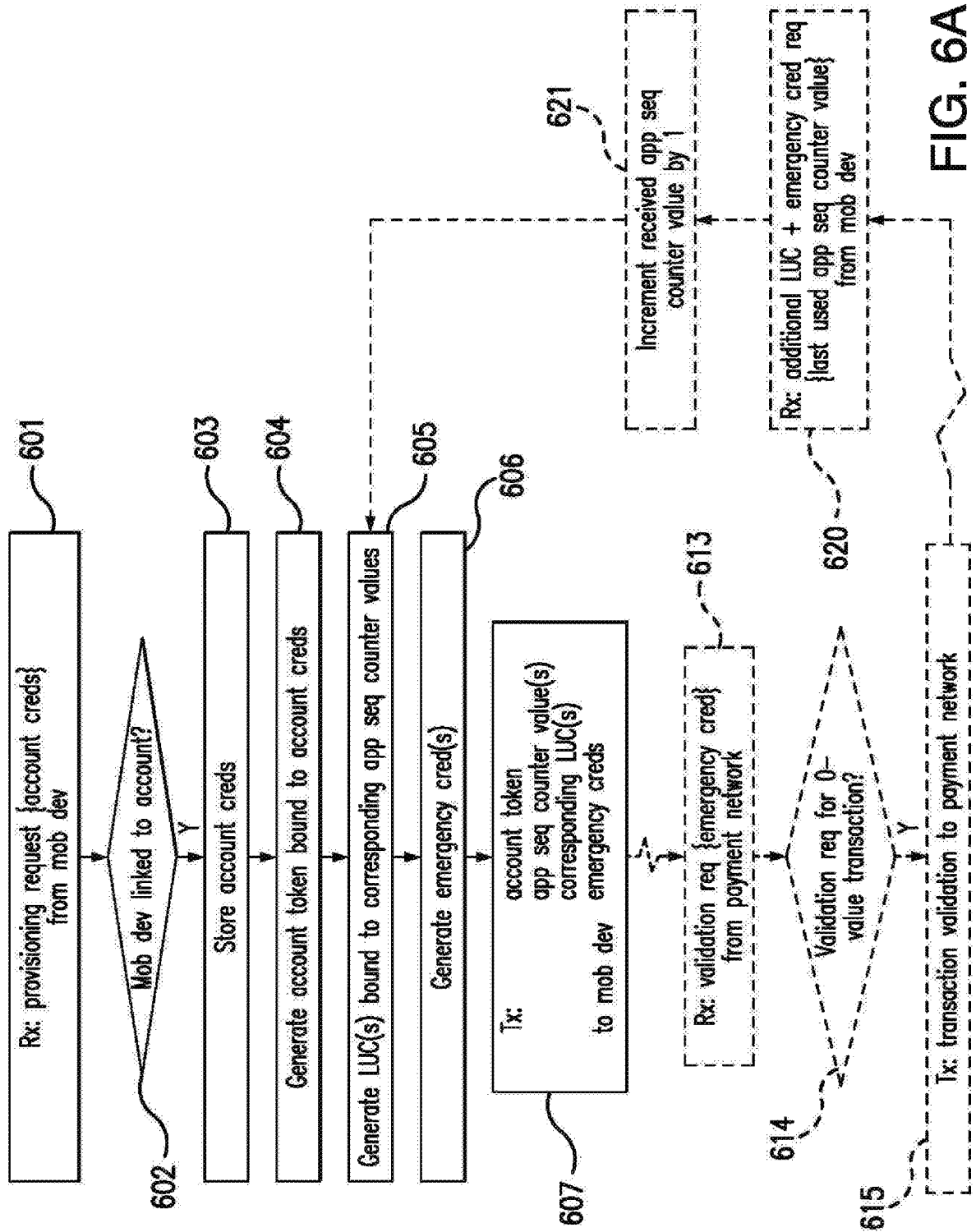
FIG. 6A is a flowchart illustrating example operation of a server system.
Figure 6B:
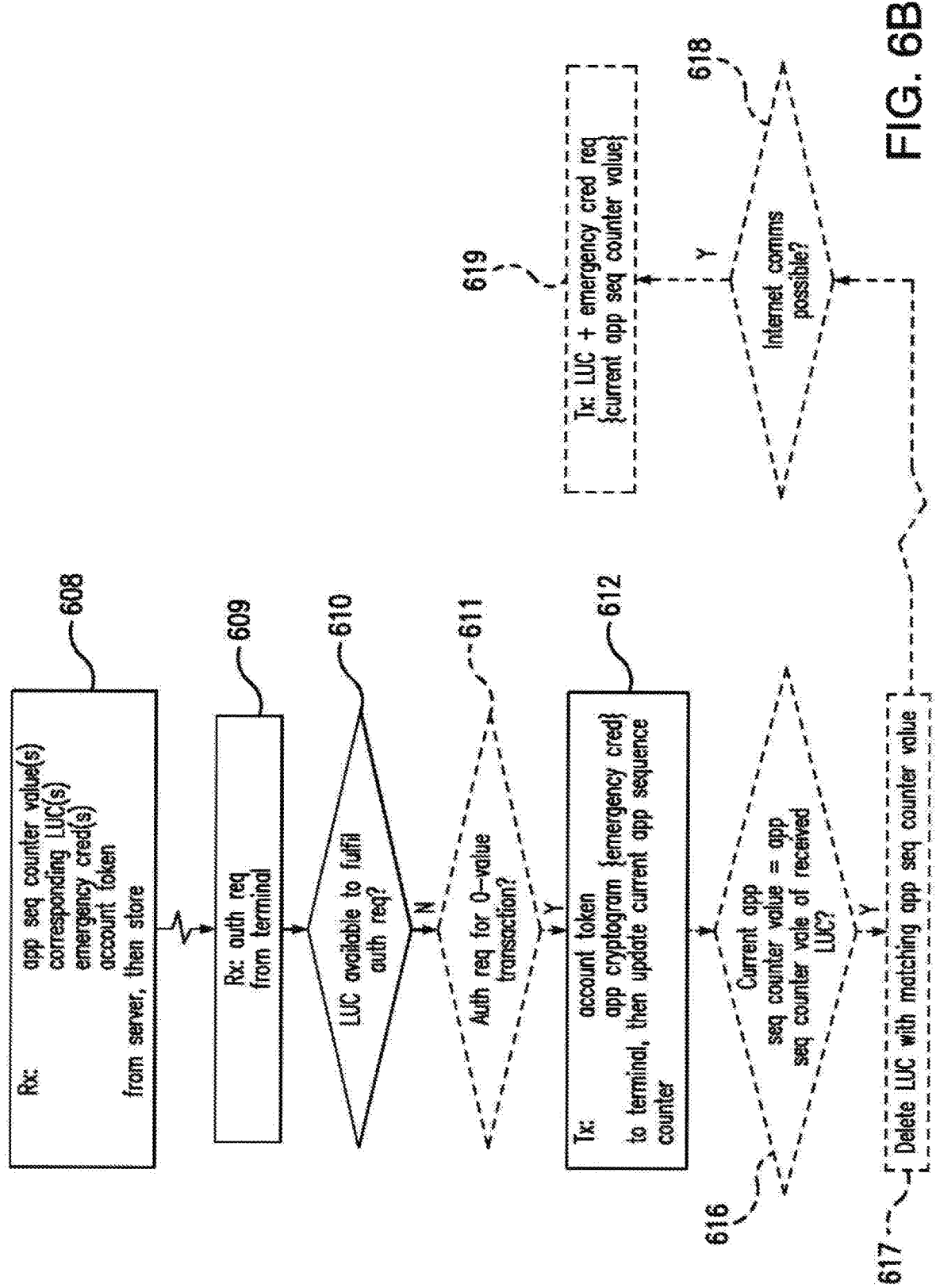
FIG. 6B is a flowchart illustrating example operation of a mobile computing device.

FIGS. 6A and 6B are flowcharts illustrating example operation of, respectively, a server system (such as the CBPBS 152 described above) and a mobile computing device (such as the mobile device 100 described above).

FIG. 6A begins at step 601, where the server system receives a provisioning request from the mobile computing device, the request comprising account credentials. At step 602, the server system authenticates that the provisioning request was received from a mobile computing device linked to the account the account credentials are for. In response to this authentication, the account credentials are then stored at step 603.

At step 604, the server system generates an account token bound to the account credentials. One or more LUCs are generated using an application sequence counter at step 605, each LUC being bound to a corresponding application sequence counter value. (Each LUC may optionally be generated based on a first issuer master key.) At step 606, the server system generates one or more emergency credentials. (If the first issue master key is used to generate the one or more LUCs, each emergency credential may optionally be generated based on a second issuer master key, different from the first issuer master key.)

The server system transmits the account token, the one or more LUCs, their respective application sequence counter values and the one or more emergency credentials to the mobile computing device at step 607. All of these may be transmitted together in one message, or split between multiple messages. For example, the emergency credentials may be transmitted in a later message than the account token, the one or more LUCs and their respective application sequence counter values.

The one or more LUCs may optionally be transmitted to the mobile computing device together with an LUC master key with which they are either already encrypted, or with which they will be encrypted for storage when received by the mobile computing device. (Alternatively an LUC master key may be transmitted separately from the LUCs.) The one or more emergency credentials may be generated using the application sequence counter, each emergency credential being bound to a corresponding application sequence counter value; and the one or more emergency credentials may be transmitted together with their respective application sequence counter values.

Turning now to FIG. 6B, at step 608 the mobile computing device receives and stores the one or more application sequence counter values, one or more LUCs, one or more emergency credentials, and the account token from the server system. The mobile computing device may optionally also receive an LUC master key with which the stored LUCs are encrypted, and store the LUC master key only in a volatile memory device of the mobile computing device.

Later, at step 609, the mobile computing device receives an authentication request from a terminal, such as the transit terminal 110 described above. At step 610 it is determined that no LUC is available for fulfilling the request. The mobile computing device may optionally also check at step 611 that the authentication request relates to a zero-value transaction, and only proceed to step 612 if so. In response to determining that no LUC is available for fulfilling the request at step 610, and optionally that the authentication request relates to a zero-value transaction at step 611, at step 612 the mobile computing device transmits, to the terminal, the account token and an application cryptogram generated from an emergency credential of said one or more emergency credentials. Each emergency credential may optionally be bound to a corresponding one of the application sequence counter values and, in that case, the application cryptogram may be generated from both the emergency credential and its corresponding application sequence counter value. Alternatively, the application cryptogram may be generated from the emergency credential and the current application sequence counter value. Once the application cryptogram has been generated, the mobile computing device updates a current application sequence counter.

Receipt of the account token and application cryptogram by the terminal may trigger communication from the terminal through a payment network to the server system. For example, the payment network may comprise back office system 120, acquirer system 130, switch 140 and issuer system 150 as described above. Returning to FIG. 6A, this may result in the server system, at step 613, receiving a request to validate use of one of the one or more emergency credentials it provided to the mobile device at step 607 in a transaction. The server system transmits a validation of the transaction to the payment network at step 615.

If the one or more LUCs and the one or more emergency credentials are all generated based on the same issuer master key then at step 614 the server system may check that the transaction is a zero-value transaction, and only proceed to transmit a transaction validation to the payment network at step 615 if so.

Returning to FIG. 6B, once the application sequence counter has been updated at step 612, the mobile computing device may optionally check, at step 616, whether the current application sequence counter value matches the application sequence counter value of any of the LUCs. Any matching LUCs are then deleted from the mobile computing device at step 617.

At a time subsequent to transmitting the application cryptogram to the terminal and updating the current application sequence counter at step 612, the mobile computing device may detect that communication over the internet is possible at step 618. In response, it may optionally transmit a request, at step 619, to the server system, for one or more additional LUCs and one or more additional emergency credentials, wherein the request comprises the current application sequence counter value.

Returning to FIG. 6A, the request for one or more additional LUCs and one or more additional emergency credentials is received by the server system at step 620. At step 621 the server system then increments the received application sequence counter value by one and uses this to return to step 605 to generate one or more additional LUCs, then step 606 to generate and one or more additional emergency credentials, and step 607 to transmit the account token, the one or more additional LUCs, their respective additional application sequence counter values and the one or more additional emergency credentials to the mobile computing device.

Other embodiments will be apparent to those skilled in the art from consideration of the specification and practice of the embodiments disclosed herein. It is intended that the specification and examples be considered as exemplary only.

In addition, where this application has listed the steps of a method or procedure in a specific order, it could be possible, or even expedient in certain circumstances, to change the order in which some steps are performed, and it is intended that the particular steps of the method or procedure claims set forth herein not be construed as being order-specific unless such order specificity is expressly stated in the claim. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

The methods described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. A non-transitory computer-readable storage medium includes, but is not limited to, volatile memory, non-volatile memory, magnetic and optical storage devices such as disk drives, magnetic tape, compact discs (CDs), digital versatile discs (DVDs), or other media that are capable of storing code and/or data.

Where a processor is referred to herein, this is to be understood to refer to a single processor or multiple processors operably connected to one another. Similarly, where a memory is referred to herein, this is to be understood to refer to a single memory or multiple memories operably connected to one another.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network personal computers (PCs), minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

User devices can include, without limitation, static user devices, such as PCs and mobile user devices, such as smartphones, tablets, laptops and smartwatches.

Receivers and transmitters as described herein may be standalone or may be comprised in transceivers. A communication link as described herein comprises at least one transmitter capable of transmitting data to at least one receiver over one or more wired or wireless communication channels. Such a communication link can optionally further comprise one or more relaying transceivers.

User input devices can include, without limitation, microphones, buttons, keypads, touchscreens, touchpads, trackballs, joysticks and mice. User output devices can include, without limitation, speakers, graphical user interfaces, indicator lights and refreshable braille displays. User interface devices can comprise one or more user input devices, one or more user output devices, or both.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, and as described, the terminology used herein is for the purpose of describing particular exemplary embodiments only and is not intended to be limiting. As used herein, the singular forms "a," "an," and "the" may be intended to include the plural forms as well, unless the context clearly indicates otherwise. And, again, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the term "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for managing access credentials, the method comprising:
   receiving, at a mobile computing device, from a server system, and storing, by the mobile computing device, in memory associated with the mobile computing device:
      multiple application sequence counter values;
      multiple limited use credentials (LUCs), each LUC bound to a corresponding one of the multiple application sequence counter values;
      one or more emergency credentials; and
      an account token; and then,
   receiving, by the mobile computing device, an authentication request from a terminal;
   in response to receiving the authentication request:
      determining, by the mobile computing device, that none of the multiple LUCs is available in the memory for fulfilling the request; and
      determining that the mobile computing device is unable to receive one or more additional LUCs from the server system; and then,
   in response to (i) determining that none of the multiple LUCs is available in the memory for fulfilling the request and (ii) determining that the mobile computing device is unable to receive the one or more additional LUCs from the server system:
      transmitting, by the mobile computing device, to the terminal, the account token and an application cryptogram generated from an emergency credential of said one or more emergency credentials; and
      updating, by the mobile computing device, a current application sequence counter.

2. The method of claim 1, further comprising:
   receiving an LUC master key with which the stored LUCs are encrypted; and
   storing the LUC master key only in a volatile memory device of the mobile computing device.

3. The method of claim 1, wherein each emergency credential is bound to a corresponding one of the application sequence counter values and the application cryptogram is generated from both the emergency credential and its corresponding application sequence counter value.

4. The method of claim 1, further comprising:
   subsequent to updating the current application sequence counter, determining, by the mobile computing device, that a current value of the application sequence counter matches the application sequence counter value of one of the LUCs; and
   in response to determining that the current value of the application sequence counter matches the application sequence counter value of one of the LUCs, deleting, by the mobile computing device, the matching LUC from the memory associated with the mobile computing device.

5. The method of claim 1, further comprising, in response to receiving the authentication request, determining, by the mobile computing device, that the authentication request relates to a zero-value transaction;
   wherein transmitting the account token and the application cryptogram is in response to determining that the authentication request relates to a zero-value transaction.

6. The method of claim 1, further comprising, subsequent to transmitting the application cryptogram to the terminal and updating the current application sequence counter:
   detecting, by the mobile computing device, that communication over the internet is possible; and
   in response to detecting that communication over the internet is possible, transmitting, by the mobile computing device, a request, to the server system, for the one or more additional LUCs and one or more additional emergency credentials, wherein the request comprises a current value of the application sequence counter.

7. The method of claim 1, wherein the application cryptogram is generated from said emergency credential of the one or more emergency credentials and the current application sequence counter value.

8. A mobile computing device for managing access credentials, the mobile computing device comprising a memory and a communication apparatus each communicatively coupled to a processor, the memory storing instructions which, when executed by the processor, cause the mobile computing device to:
- receive, from a server system, and store on the mobile computing device:
  - multiple application sequence counter values;
  - multiple limited use credentials (LUCs), each LUC being bound to a corresponding one of the multiple application sequence counter values;
  - one or more emergency credentials; and
  - an account token; and then,
- receive an authentication request from a terminal;
- in response to the authentication request:
  - determine that none of the multiple LUCs is available on the mobile computing device for fulfilling the request; and
  - determine that the mobile computing device is unable to receive one or more additional LUCs from the server system; and then,
- in response to the determination that no LUC is available on the mobile computing device for fulfilling the request, and in response to the determination that the mobile computing device being is unable to receive the one or more additional LUCs from the sever system:
  - transmit, to the terminal, the account token and an application cryptogram generated from an emergency credential of said one or more emergency credentials; and
  - update a current application sequence counter.

* * * * *